(12) United States Patent
Lai

(10) Patent No.: US 11,324,308 B2
(45) Date of Patent: May 10, 2022

(54) QUICK ASSEMBLY TABLE AND INSTALLATION METHOD THEREOF

(71) Applicant: Foshan City Shunde District Aigou Industrial Design Co., Ltd, Foshan (CN)

(72) Inventor: Tak Pui Lai, Foshan (CN)

(73) Assignee: FOSHAN CITY SHUNDE DISTRICT AIGOU INDUSTRIAL DESIGN CO., LTD, Foshan (CN)

( * ) Notice: Subject to any disclaimer, the term of this patent is extended or adjusted under 35 U.S.C. 154(b) by 11 days.

(21) Appl. No.: 17/002,290

(22) Filed: Aug. 25, 2020

(65) Prior Publication Data

US 2021/0219711 A1    Jul. 22, 2021

(30) Foreign Application Priority Data

Jan. 18, 2020   (CN) .......................... 202010056103.5

(51) Int. Cl.
*A47B 3/06* (2006.01)
*A47B 13/00* (2006.01)
(Continued)

(52) U.S. Cl.
CPC .............. *A47B 3/06* (2013.01); *A47B 13/003* (2013.01); *F16B 12/10* (2013.01); *F16B 12/44* (2013.01);
(Continued)

(58) Field of Classification Search
CPC ......... A47B 3/06; A47B 13/003; A47B 13/02; F16B 12/10; F16B 12/14; F16B 2012/106;
(Continued)

(56) References Cited

U.S. PATENT DOCUMENTS 1,951,499 A * 3/1934 Brown ...................... A47B 3/12
108/154
2,253,172 A * 8/1941 Fetterman .............. A47B 37/04
108/158.11
(Continued)

FOREIGN PATENT DOCUMENTS

CA          2601651    *  3/2008
CN         201713192   *  1/2011
(Continued)

*Primary Examiner* — Janet M Wilkens
(74) *Attorney, Agent, or Firm* — Dragon Sun Law Firm, PC; Jinggao Li, Esq.

(57) ABSTRACT

A quick assembly table and an installation method is disclosed. The table includes a tabletop and legs. The legs are evenly arranged at a bottom of the tabletop, a sliding slot is disposed at the bottom of the tabletop, the legs slide along and fit into the sliding slot, the legs are connected by an annular beam in between, the annular beam is fitted with a locking screw, and the locking screw expands or shrinks the annular beam to push the legs to slide along the sliding slot. The tabletop and legs are installed in a slide-and-fit manner without screws, and are convenient to assemble and disassemble. In addition, relative locations between all the legs and the tabletop can be adjusted synchronously through expansion or shrinkage of the annular beam, making adjustment flexible and convenient.

8 Claims, 4 Drawing Sheets

(51) Int. Cl.
*F16B 12/10* (2006.01)
*F16B 12/44* (2006.01)
(52) U.S. Cl.
CPC ... *F16B 2012/106* (2013.01); *F16B 2012/446* (2013.01)
(58) Field of Classification Search
CPC ............. F16B 2012/446; F16B 5/0052; Y10T 403/7094; Y10T 403/7105; Y10T 403/7129; Y10T 403/7141; Y10T 403/29; Y10T 403/291; Y10T 403/293
USPC ..... 108/157.16, 157.15, 50.12, 153.1, 157.1, 108/157.18, 159.11, 158, 11, 158.12, 108/158.13; 248/172, 163.1, 440, 440.1, 248/188, 188.1, 188.8, 165
See application file for complete search history.

(56) References Cited

U.S. PATENT DOCUMENTS

| | | | | |
|---|---|---|---|---|
| 3,215,381 A * | 11/1965 | Ching | | A47B 37/04 248/167 |
| 3,643,608 A * | 2/1972 | DeCesaris | | A47B 3/12 108/153.1 |
| 3,934,519 A * | 1/1976 | Petit | | A47B 13/06 108/150 |
| 4,128,063 A * | 12/1978 | Avery | | A47C 4/03 108/91 |
| 4,823,709 A * | 4/1989 | Tesney | | A47B 13/023 108/157.15 |
| 4,905,612 A * | 3/1990 | Apissomian | | A47B 3/12 108/157.15 |
| 4,941,413 A * | 7/1990 | Vanderminden | | A47B 3/12 108/156 |
| 5,318,260 A * | 6/1994 | Kemnitz | | A47B 13/02 108/50.12 |
| 5,464,305 A * | 11/1995 | Liem | | A47B 13/02 403/362 |
| 5,509,360 A * | 4/1996 | Chiu | | A47B 3/02 108/119 |
| 6,006,679 A * | 12/1999 | Lin | | A47B 3/02 108/157.15 |
| 7,666,483 B2 * | 2/2010 | Barthelmess | | A41G 1/007 428/19 |
| 8,418,633 B1 * | 4/2013 | Lee | | A47B 13/003 108/157.1 |
| 8,418,982 B1 * | 4/2013 | Vatus | | A47B 13/02 248/431 |
| 2003/0010261 A1 * | 1/2003 | Liu | | A47B 13/06 108/153.1 |
| 2006/0196396 A1 * | 9/2006 | Rivera | | A47B 3/12 108/157.1 |
| 2007/0029731 A1 * | 2/2007 | Barker | | A47G 21/167 273/309 |
| 2015/0173504 A1 * | 6/2015 | Price | | A47B 13/003 108/185 |
| 2016/0120302 A1 * | 5/2016 | Rassat | | A47C 5/04 108/158.11 |

FOREIGN PATENT DOCUMENTS

| | | | |
|---|---|---|---|
| CN | 107772780 | * | 3/2018 |
| CN | 110448055 | * | 11/2019 |
| DE | 102014110743 | * | 2/2016 |
| WO | 2010040241 | * | 4/2010 |

* cited by examiner

QUICK ASSEMBLY TABLE AND INSTALLATION METHOD THEREOF

TECHNICAL FIELD

The present disclosure relates to the field of furniture, and in particular, to a quick assembly table and an installation method thereof.

BACKGROUND

Tables are indispensable items in life and work. A table includes a tabletop, legs, and beams connecting between the legs. Currently, the tabletop, the legs, and the beams of a mainstream table in the market are connected by welding, screws, or tenon-mortise structures. Such conventional connection manners do not support assembly or disassembly, or are inconvenient to assemble or disassemble, or are likely to loosen. Therefore, it is necessary to optimize the connection manner and the installation method of the table.

SUMMARY

To resolve the technical problems, the present disclosure provides a quick assembly table and an installation method thereof. The table is convenient to assemble and disassemble, with its position being flexibly adjustable.

The first technical problem described above is resolved by the following technical solution: A quick assembly table, including a tabletop and legs, where the legs are evenly arranged at a bottom of the tabletop, a sliding slot is disposed at the bottom of the tabletop, the legs slide along and fit into the sliding slot, the legs are connected by an annular beam in between, the annular beam is fitted with a locking screw, and the locking screw expands or shrinks the annular beam to push the legs to slide along the sliding slot.

Compared with the background technology, the present disclosure brings the following beneficial effects: The tabletop and legs are installed in a slide-and-fit manner without screws, and are convenient to assemble and disassemble. In addition, relative locations between all the legs and the tabletop can be adjusted synchronously through expansion or shrinkage of the annular beam, making adjustment flexible and convenient.

In an embodiment, the annular beam is an annular structure, and the annular beam has at least one breakpoint and is connected by the locking screw at the breakpoint, the locking screw is a dual-head stud, and threads of the dual-head stud are arranged reversely.

In an embodiment, each leg has a riveted leg bulge, and the leg bulge has a mortise; the annular beam has two breakpoints and is divided into two arc beams, each arc beam has a riveted annular beam bulge, the annular beam bulge has a tenon, and the tenon is fitted into the mortise.

In an embodiment, the tenon and the mortise take on a frustum structure, and an auxiliary notch exists on a lower surface of the mortise.

Beneficial effects: The tenon and mortise take on a frustum structure, helping to eliminate dimensional errors of the tenon and the mortise and ensure close mating between the tenon and the mortise. In addition, the auxiliary notch facilitates mating and installation of the annular beam and the legs, and helps to reduce friction between tenon and mortise.

In an embodiment, a flange is disposed on a nut of the locking screw.

Beneficial effects: The flange is convenient for a user to rotate the locking screw by hand and adjust the size of the annular beam.

In an embodiment, a height-adjusting balance nut is disposed at a bottom of each leg; and a slider is disposed at a top of the leg, and the slider slides along and clutches the sliding slot.

Beneficial effect: The balance nut helps to adjust levelness of the tabletop.

In an embodiment, the legs take on a 7-shaped structure with an arc transition, and the annular beam is disposed at the arc transition.

In an embodiment, the tabletop includes an outer frame, a crossbar, and a panel, the panel is disposed in a frame body defined by the outer frame and the crossbar, the sliding slot is disposed on the crossbar, a positioning point exists in the sliding slot, and the positioning point is a baffle at an end of the sliding slot.

Beneficial effects: The positioning point helps to fix positions of the legs, avoids detachment of the legs off the sliding slot due to excessive expansion of the annular beam, and ensures reliability of a structure of the table.

In an embodiment, the annular beam has a support rod that crosses a circle center of the annular beam, a ferrule exists in a middle of the support rod, and circle centers of the ferrule, the annular beam, and the tabletop are coaxial. Beneficial effects: The support rod facilitates collaboration between a sunshade umbrella and the table, and helps to put a handle of the sunshade umbrella through a center of the tabletop and insert the handle into the ferrule, thereby fixing the sunshade umbrella and improving an application scope of the table.

In an embodiment, a hook is disposed at both ends of the support rod, the hook is fastened onto the annular beam, and stopper ribs that mate with the locking screw are disposed on the hook.

Beneficial effects: The support rod is connected to the annular beam by a hook, so that the table may be installed without screws, and is convenient to assemble and disassemble. In addition, the stopper rib of the hook and the locking screw effectively prevent the support rod from sliding on the annular beam.

The above embodiments may be combined arbitrarily to form a combined embodiment depending on product design requirements as long as the technical solutions are not contradictory.

The second technical problem described above is resolved by the following technical solution: A table installation method, including: sliding a tabletop to fit onto legs first, then clasping an annular beam, which has been assembled in an annular structure, to the legs, and finally adjusting the annular beam to expand the annular beam in a radial direction, and pushing the legs to slide to a stopper position.

Compared with the background technology, the present disclosure brings the following beneficial effects: The tabletop and legs are installed in a slide-and-fit manner without screws, and are convenient to assemble and disassemble. In addition, relative locations between all the legs and the tabletop can be adjusted synchronously through expansion or shrinkage of the annular beam, making adjustment flexible and convenient.

Figure 1:
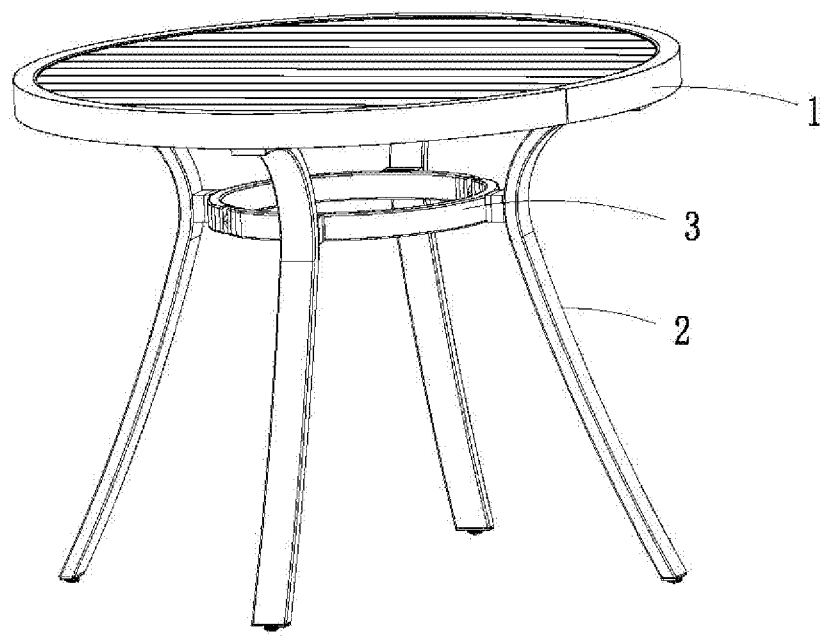
FIG. 1 is a schematic structural diagram of Embodiment 1 of the present disclosure.
Figure 2:
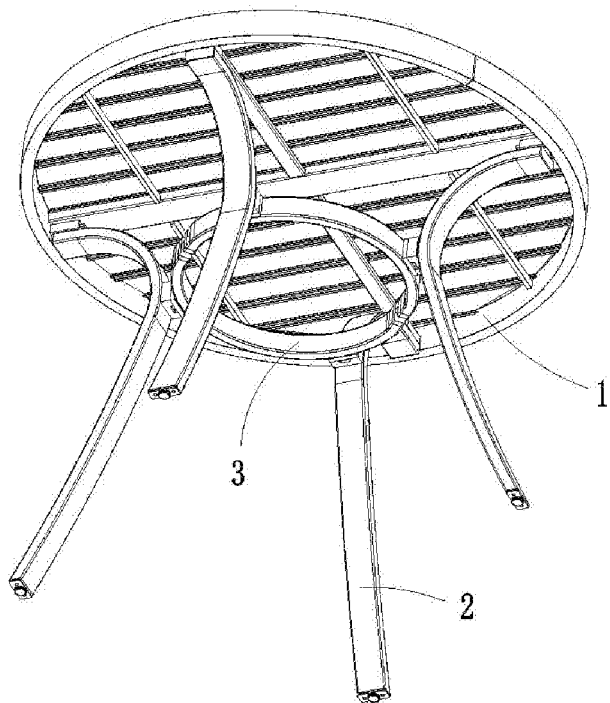
FIG. 2 is a schematic structural diagram from another perspective of Embodiment 1 of the present disclosure.
Figure 3:
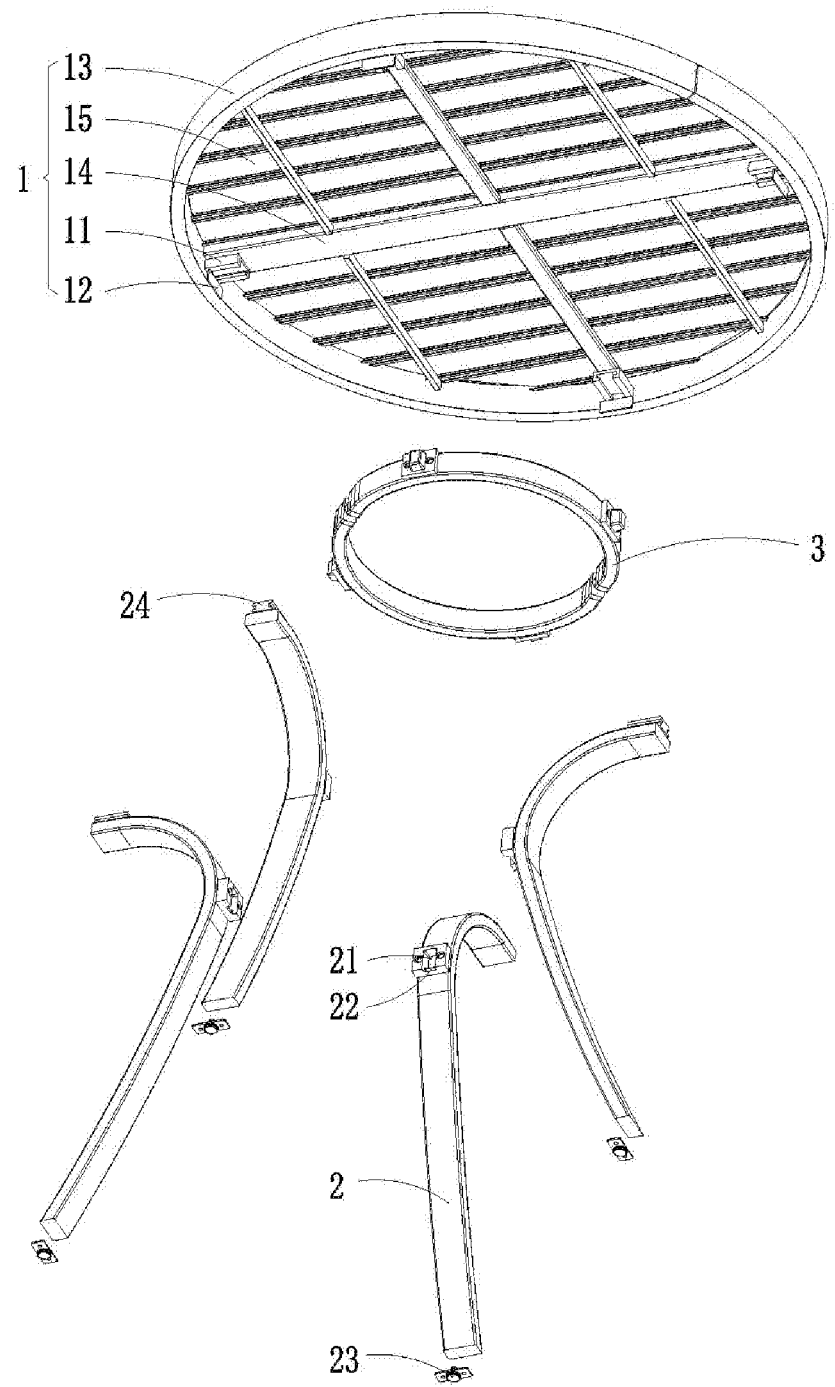
FIG. 3 is a schematic structural exploded view of Embodiment 1 of the present disclosure.

Reference numerals: 1 tabletop, 11 sliding slot, 12 positioning point, 13 outer frame, 14 crossbar, 15 panel, 2 leg, 21 mortise, 22 auxiliary notch, 23 balance nut, 24 slider, 3 annular beam, 31 locking screw, 32 arc beam, 33 tenon, 34 flange, 4 support rod, 41 ferrule, 42 hook, 43 stopper rib.

DESCRIPTION OF EMBODIMENTS

The following gives a more detailed description of specific implementations of the present disclosure with reference to accompanying drawings and embodiments. The following embodiments are intended as a description of the present disclosure rather than a limitation on the scope of the present disclosure.

Embodiment 1

As shown in FIG. 1 to FIG. 5, a quick assembly table in this embodiment includes a tabletop 1 and legs 2. The legs 2 are evenly arranged at a bottom of the tabletop 1.

The tabletop 1 includes an outer frame 13, a crossbar 14, and a panel 15, and the panel 15 is disposed in a frame body defined by the outer frame 13 and the crossbar 14. A sliding slot 11 is disposed at the bottom of the tabletop 1, and the sliding slot 11 is disposed on the crossbar 14. A positioning point 12 exists in the sliding slot 11, and the positioning point 12 is a baffle at an end of the sliding slot 11.

A height-adjusting balance nut 23 is disposed at a bottom of each leg 2. A slider 24 exists at a top of the leg 2, and the slider 24 slides along and clutches the sliding slot 11, so that the leg 2 slides along and fits into the sliding slot 11. The legs 2 take on a 7-shaped structure with an arc transition, and each leg 2 has an annular beam 3 disposed at the arc transition.

Figure 4:
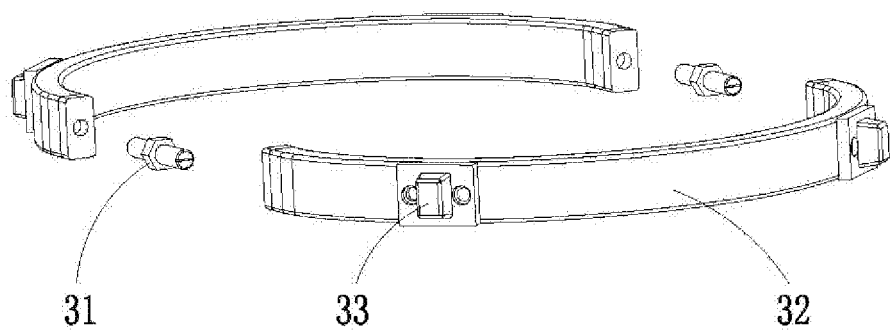
FIG. 4 is a schematic structural exploded view of an annular beam according to Embodiment 1 of the present disclosure.
Figure 5:
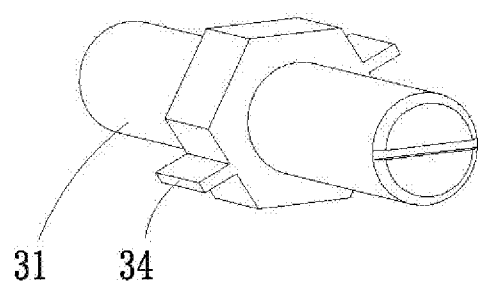
FIG. 5 is a schematic structural diagram of a locking screw according to another embodiment of the present disclosure.

As shown in FIG. 4, the annular beam 3 has a locking screw 31. The locking screw 31 expands or shrinks the annular beam 3 to push the legs 2 to slide along the sliding slot 11. The annular beam 3 is an annular structure and has two breakpoints, and is divided into two arc beams 32. The arc beam 32 are installed on an inner side of the legs 2. Adjacent arc beams 32 are connected by the locking screw 31 (that is, connected by the locking screw 31 at the breakpoints). The locking screw 31 is a dual-head stud, and threads of the dual-head stud are arranged reversely. Preferably, a flange 34 exists on a nut of the locking screw 31, as shown in FIG. 5.

To install the arc beam 32 on the legs 2, each leg 2 has a riveted leg bulge. The leg bulge has a mortise 21. The arc beam 32 has a riveted annular beam bulge, the annular beam bulge has a tenon 34, and the tenon 34 fits into the mortise 21. The tenon 33 and the mortise 21 take on a frustum structure, and an auxiliary notch 22 exists on a lower surface of the mortise 21.

Embodiment 2

Figure 6:
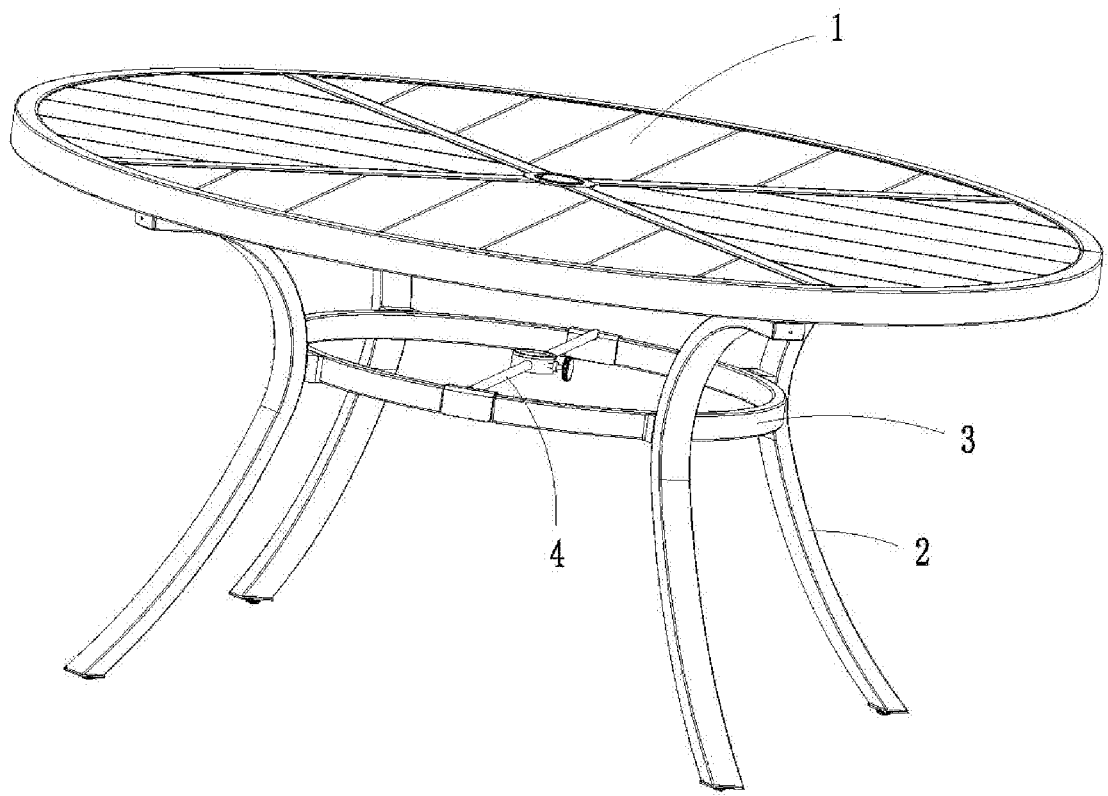
FIG. 6 is a schematic structural diagram of Embodiment 2 of the present disclosure.
Figure 7:
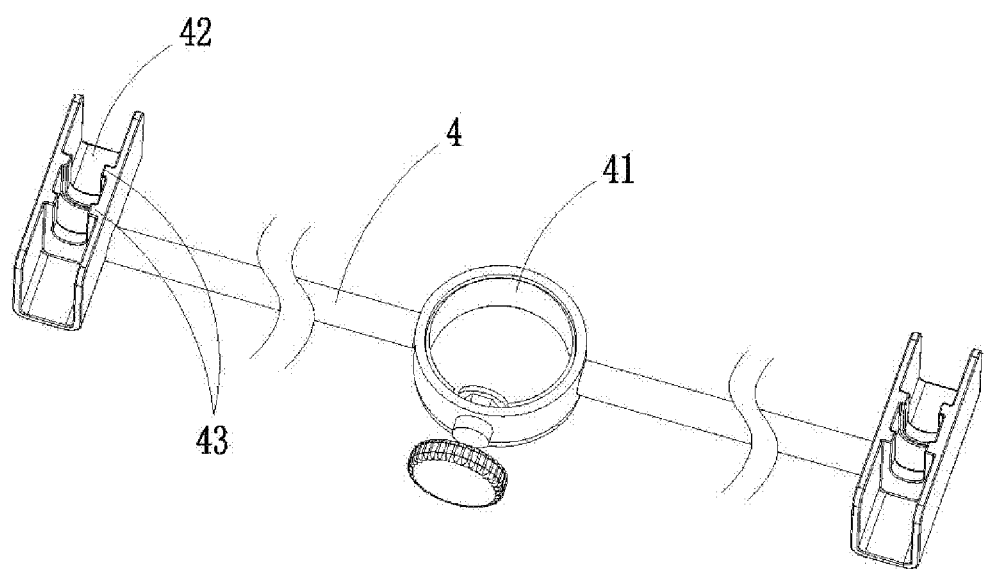
FIG. 7 is a schematic structural diagram of a support rod according to Embodiment 2 of the present disclosure.

As shown in FIG. 6 and FIG. 7, this embodiment is based on Embodiment 1, and an annular beam 3 has a support rod 4 that crosses a circle center of the annular beam. A ferrule 41 exists in a middle of the support rod 4. Circle centers of the ferrule 41, the annular beam 3, and a tabletop 1 are coaxial, so that it is convenient for a sunshade umbrella to pass through the circle center of the three to protect users from sunlight and rain. A hook 42 is disposed at both ends of the support rod 4, the hook 42 is fastened onto the annular beam 3, and stopper ribs 43 that mate with the locking screw 31 are disposed on the hook 42. The hook 42 clamps the locking screw 31 through the stopper ribs 43, so as to ensure that the support rod 4 and the annular beam 3 remain relatively stationary and to prevent the support rod 4 from sliding.

During installation of a table provided in the present disclosure, the tabletop 1 and the legs 2 are fitted together directly through the sliding slot 11 and the slider 24, and then the annular beam 3 that has been assembled into an annular structure is installed onto the legs 2 through the auxiliary notch 22 of each leg 2. Finally, the locking screw 31 of the annular beam 3 is adjusted to expand the annular beam 3 in the radial direction, so that the legs 2 are pushed to slide along the sliding slot 11 to the positioning point 12 to complete the installation. During disassembly, the locking screw 31 is adjusted to reduce a diameter of the annular beam 3 until the annular beam 3 is removed through the auxiliary notch 22 of the leg 2. Finally, the slider 24 of the leg 2 is separated from the sliding slot 11 of the tabletop 1 to complete the disassembly.

The foregoing descriptions are merely exemplary implementations of the present disclosure. Various improvements and replacements made by a person of ordinary skill in the art without departing from the technical principles of the present disclosure shall fall within the protection scope of the present disclosure.

What is claimed is:

1. A quick assembly table, comprising a tabletop and legs, wherein the legs are evenly arranged at a bottom of the tabletop, a sliding slot is disposed at the bottom of the tabletop the legs slide along and fit into the sliding slot, the legs are connected by an annular beam in between, the annular beam is fitted with a locking screw, and the locking screw expands or shrinks the annular beam to push the legs to slide along the sliding slot;

wherein the annular beam is an annular structure, and the annular beam has at least one breakpoint and is connected by the locking screw at the breakpoint, the locking screw is a dual-head stud, and threads of the dual-head stud are arranged reversely.

2. The quick assembly table according to claim 1, wherein each leg has a riveted leg bulge, and the leg bulge has a mortise; the annular beam has two breakpoints and is divided into two arc beams each arc beam has a riveted annular beam bulge, the annular beam bulge has a tenon and the tenon is fitted into the mortise.

3. The quick assembly table according to claim 2, wherein the tenon and the mortise take on a frustum structure, and an auxiliary notch exists on a lower surface of the mortise.

4. The quick assembly table according to claim 1, wherein a flange is disposed on a nut of the locking screw.

5. The quick assembly table according to claim 1, wherein a height-adjusting balance nut is disposed at a bottom of each leg; and a slider is disposed at a top of the leg and the slider slides along and clutches the sliding slot.

6. The quick assembly table according to claim 1, wherein the tabletop comprises an outer frame a crossbar and a panel, the panel is disposed in a frame body defined by the outer frame and the crossbar, the sliding slot is disposed on the crossbar, a positioning point exists in the sliding slot, and the positioning point is a baffle at an end of the sliding slot.

7. The quick assembly table according to claim 1, wherein the annular beam has a support rod that crosses a circle center of the annular beam, a ferrule exists in a middle of the support rod, and circle centers of the ferrule, the annular beam, and the tabletop are coaxial.

8. The quick assembly table according to claim 7, wherein a hook is disposed at both ends of the support rod, the hook is fastened onto the annular beam, and stopper ribs that mate with the locking screw are disposed on the hook.

* * * * *